United States Patent
Diab et al.

(10) Patent No.: US 8,392,637 B2
(45) Date of Patent: Mar. 5, 2013

(54) SYSTEM AND METHOD FOR ENABLING LEGACY MEDIUM ACCESS CONTROL TO DO ENERGY EFFICENT ETHERNET

(75) Inventors: Wael William Diab, San Francisco, CA (US); Howard Frazier, Pleasanton, CA (US)

(73) Assignee: Broadcom Corporation, Irvine, CA (US)

( * ) Notice: Subject to any disclaimer, the term of this patent is extended or adjusted under 35 U.S.C. 154(b) by 359 days.

(21) Appl. No.: 12/407,911

(22) Filed: Mar. 20, 2009

(65) Prior Publication Data
US 2010/0023658 A1   Jan. 28, 2010

Related U.S. Application Data

(60) Provisional application No. 61/083,625, filed on Jul. 25, 2008.

(51) Int. Cl.
*G06F 3/00* (2006.01)
(52) U.S. Cl. ............ 710/59; 710/58; 710/60; 710/61
(58) Field of Classification Search .................. None
See application file for complete search history.

(56) References Cited

U.S. PATENT DOCUMENTS

| | | | | |
|---|---|---|---|---|
| 6,029,202 A * | 2/2000 | Frazier et al. | | 709/232 |
| 6,167,029 A * | 12/2000 | Ramakrishnan | | 370/235 |
| 7,065,582 B1 * | 6/2006 | Dwork et al. | | 709/234 |
| 2004/0085894 A1 * | 5/2004 | Wang et al. | | 370/216 |
| 2005/0013250 A1 * | 1/2005 | Kauschke et al. | | 370/235 |
| 2005/0097378 A1 * | 5/2005 | Hwang | | 713/320 |
| 2005/0147121 A1 * | 7/2005 | Burrell et al. | | 370/468 |
| 2005/0182848 A1 * | 8/2005 | McNeil et al. | | 709/235 |
| 2006/0109784 A1 * | 5/2006 | Weller et al. | | 370/229 |
| 2007/0127581 A1 * | 6/2007 | Connor et al. | | 375/257 |
| 2007/0248118 A1 * | 10/2007 | Bishara et al. | | 370/469 |

FOREIGN PATENT DOCUMENTS
WO   WO 2007/012400   11/2007

OTHER PUBLICATIONS

EP Search Report, Nov. 11, 2009.
Francisco Blanquicet et al., "An Initial Performance Evaluation of Rapid PHY Selection (RPS) for Energy Efficient Ethernet," $32^{nd}$ IEEE Conference on Local Computer Networks, pp. 223-225, Oct. 1, 2007.
Wael Diab et al., "Ethernet in the First Mile: Access for Everyone," Chapter 12, IEEE Press, 2006.

\* cited by examiner

*Primary Examiner* — Henry Tsai
*Assistant Examiner* — Jing-Yih Shyu
(74) *Attorney, Agent, or Firm* — Duane S. Kobayashi

(57) ABSTRACT

A system and method for enabling legacy media access control (MAC) to do energy efficient Ethernet (EEE). A backpressure mechanism is included in an EEE enhanced PHY that is responsive to a detected need to transition between various power modes of the EEE enhanced PHY. Through the backpressure mechanism, the EEE enhanced PHY can indicate to the legacy MAC that transmission of data is to be deferred due to a power savings initiative in the EEE enhanced PHY.

16 Claims, 5 Drawing Sheets

SYSTEM AND METHOD FOR ENABLING LEGACY MEDIUM ACCESS CONTROL TO DO ENERGY EFFICENT ETHERNET

This application claims priority to provisional application No. 61/083,625, filed Jul. 25, 2008, which is incorporated by reference herein, in its entirety, for all purposes.

BACKGROUND

1. Field of the Invention

The present invention relates generally to Ethernet systems and, more particularly, to a system and method for enabling legacy media access control to do energy efficient Ethernet (EEE).

2. Introduction

Energy costs continue to escalate in a trend that has accelerated in recent years. Such being the case, various industries have become increasingly sensitive to the impact of those rising costs. One area that has drawn increasing scrutiny is the IT infrastructure. Many companies are now looking at their IT systems' power usage to determine whether the energy costs can be reduced. For this reason, an industry focus on energy efficient networks has arisen to address the rising costs of IT equipment usage as a whole (i.e., PCs, displays, printers, servers, network equipment, etc.).

In designing an energy efficient solution, one of the considerations is the traffic profile on the network link. For example, many network links are typically in an idle state between sporadic bursts of data, while in other network links, there can be regular or intermittent low-bandwidth traffic, with bursts of high-bandwidth traffic. An additional consideration for an energy efficient solution is the extent to which the traffic is sensitive to buffering and latency. For example, some traffic patterns (e.g., HPC cluster or high-end 24-hr data center) are very sensitive to latency such that buffering would be problematic. For these and other reasons, applying energy efficient concepts to different traffic profiles would lead to different solutions. These varied solutions can therefore seek to adapt the link, link rate, and layers above the link to an optimal solution based on various energy costs and impact on traffic, which itself is dependent on the application.

As would be appreciated, an EEE solution typically requires coordination between various layers. For example, an EEE mechanism can be implemented in a physical layer device (PHY) to transition the PHY between various energy states. In supporting these various PHY energy states, the MAC and upper layers (including silicon, software and firmware) would also need to control its operation to implement the EEE control policy. Ideally, a MAC-containing device would be enhanced to accommodate such an EEE mechanism. Otherwise, any PHY innovations for EEE would be rendered useless in systems that contain legacy MAC silicon. What is needed therefore is a mechanism that enables legacy MACs to cooperate with an EEE-enabled PHY.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

SUMMARY

Figure 1:
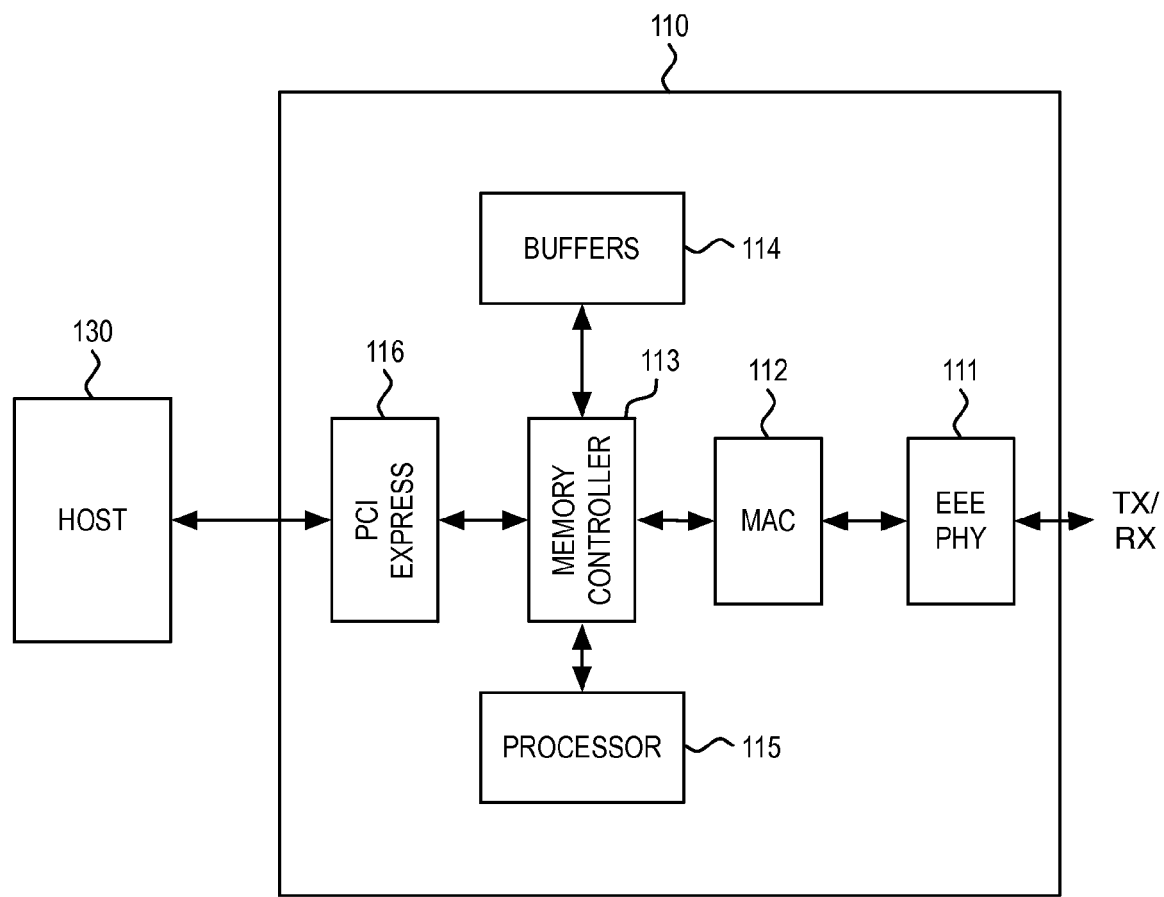
FIG. 1 illustrates an example of a controller.

A system and method for enabling legacy media access control to do energy efficient Ethernet (EEE), substantially as shown in and/or described in connection with at least one of the figures, as set forth more completely in the claims.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Ethernet has become an increasingly pervasive technology that has been applied in various contexts (e.g., twisted pair, backplane, etc.). IEEE 802.3az Energy Efficient Ethernet (EEE) continues to evaluate various methods for reducing energy used during periods of low link utilization. In this process, a protocol can be defined that would facilitate transition to and from lower power consumption modes in response to changes in network demand.

In general, a reduction in link rate to a sub-rate of the main rate enables a reduction in power, thereby leading to energy savings. In one example, this sub-rate can be a zero rate, which produces maximum power savings.

One example of subrating is through the use of a subset PHY technique. In this subset PHY technique, a low link utilization period can be accommodated by transitioning the PHY to a lower link rate that is enabled by a subset of the parent PHY. In one embodiment, the subset PHY technique is enabled by turning off portions of the parent PHY to enable operation at a lower or subset rate. For example, a subset 1 G PHY can be created from a parent 10 GBASE-T PHY by a process that turns off three of the four channels. In another embodiment, the subset PHY technique is enabled by slowing down the clock rate of a parent PHY. For example, a parent PHY having an enhanced core that can be slowed down and sped up by a frequency multiple can be slowed down by a factor of 10 during low link utilization, then sped up by a factor of 10 when a burst of data is received. In this example of a factor of 10, a 10 G enhanced core can be transitioned down to a 1 G link rate when idle, and sped back up to a 10 G link rate when data is to be transmitted.

Another example of subrating is through the use of a low power idle (LPI) technique. In general, LPI relies on turning the active channel silent when there is nothing to transmit. Energy is thereby saved when the link is off. Refresh signals can be sent periodically to enable wakeup from the sleep mode. In one embodiment, a sync signal can be used on the interfaces (i.e., medium dependent interface (MDI) and PHY/medium access control (MAC) interface) to allow for a quick wake-up from the sleep mode and maintain frequency lock.

For example, on the MDI interface for a 10 GBASE-T signal, a simple PAM2 pseudorandom bit sequence could be used on pair A during LPI mode. This would not significantly increase the power that is consumed. In general, both the subset and LPI techniques involve turning off or otherwise modifying portions of the PHY during a period of low link utilization.

Regardless of the particular low power consumption modes that are supported by an EEE PHY, the coupling of an EEE PHY with a legacy MAC would render those EEE mechanisms in the PHY useless. It is therefore desirable to be able to reuse existing MAC devices with new EEE PHYs in a manner that does not cripple the EEE PHY's functionality.

This feature of the present invention is especially valuable when considering the large market of controller or switch chips that integrate a MAC, or legacy chips that include a MAC and PHY but allows for an external PHY connection. In this environment, external EEE PHYs can be coupled to existing legacy MACs. By introducing a mechanism that enables EEE PHY functionality to work with legacy MAC devices, EEE benefits can accrue to the existing legacy devices without requiring an overhaul of the entire device.

To save energy, the capacity of the link is reduced. When the PHY is in a low energy state, the layers above the PHY still have the capability to burst at the full rate that was initially negotiated on linkup. If the MAC and higher layers are EEE enabled, the subsystems above the PHY would include enough buffering to allow for the link to be restored to initial rate. In legacy systems that are not EEE enabled, however, even if the memory exists the subsystems above the PHY may not be able to use it in real time.

In accordance with the present invention, a MAC-containing device (e.g., network switch, controller, etc.) would be enhanced to accommodate an EEE mechanism. In one embodiment, a backpressure mechanism is introduced that would allow a legacy MAC to hold off from transmitting when the PHY is in a low energy state or the PHY is coming out of a low energy state. Further, the buffering system in the backpressure mechanism can be used by the EEE control policy in triggering transitions in and out of the various PHY energy states. Indeed, it is a feature of the present invention that chip memory that is conventionally used for the PAUSE frame can be reused such that no additional memory for EEE is required for the buffering during transitions between energy states as well as assisting the EEE control policy.

FIG. 1 illustrates one example of a MAC-containing device embodied as a controller. In various examples, the controller can be part of a client (e.g., laptop, desktop or workstation), a server (e.g., audio-video (AV) server, high performance computing (HPC) server), or a consumer edge device (e.g., HDTV, Blueray, etc.). As illustrated, host system 130 is coupled to integrated Ethernet controller 110. Ethernet controller 110 further includes PHY 111, which is coupled to MAC 112. In the illustrated example, MAC 112 is coupled to PCI Express device 116 via memory controller 113, which is also coupled to buffers 114 and processor 115.

Figure 2:
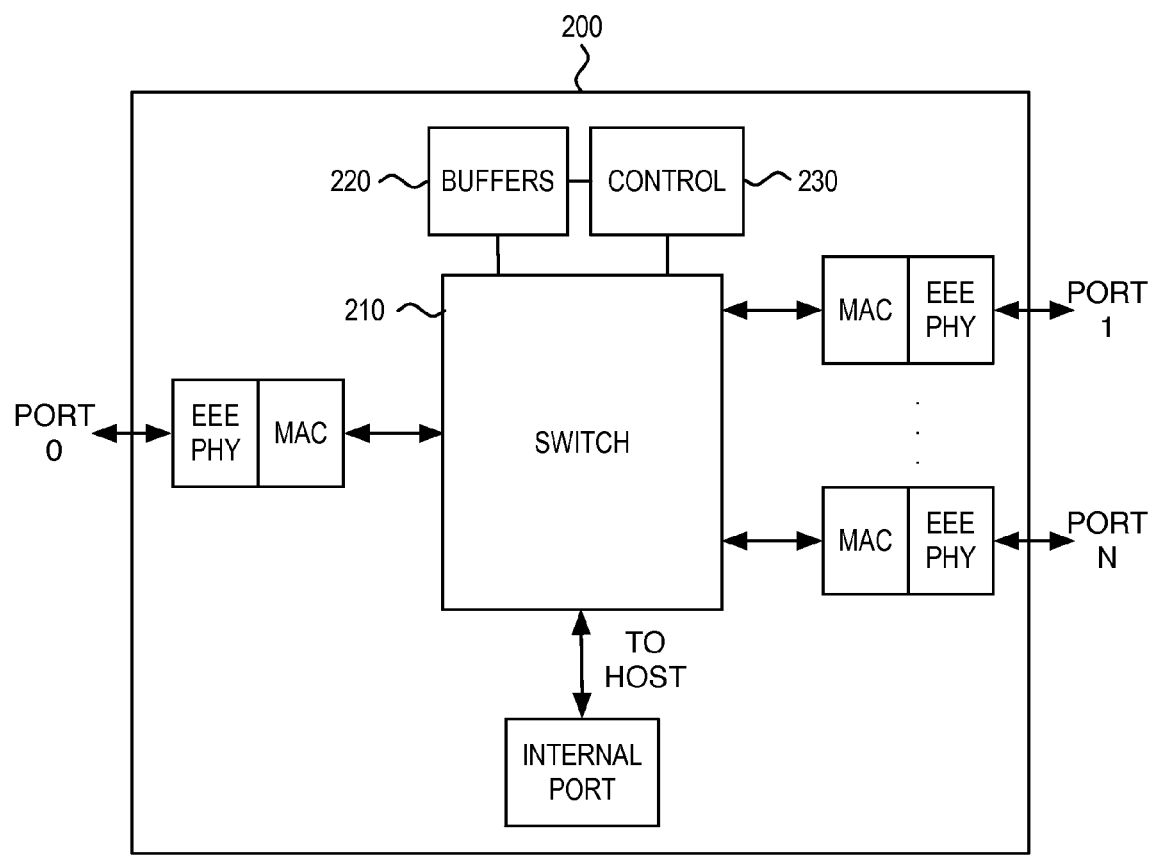
FIG. 2 illustrates an example of a switch.

FIG. 2 illustrates another example of a MAC-containing device embodied as a network switch. In various examples, switching system 200 can represent a router or any other device that incorporates multi-port switch functionality. In various examples, the switch can be a consumer, SMB, enterprise, metro, or access switch. In another example, switching system 200 can represent a voice over IP (VoIP) chip that has a network interface (Port 0) and a PC interface (Port 1). In yet another example, switching system 200 can represent a customer premise equipment (CPE) device in a service provider access network that can have an optical central office (CO) facing interface (Port 0) and multiple interfaces (Ports 1-N) that are facing the home and/or gateway (e.g., the CPE can simply be a media converter and/or part of the home gateway). Still further, switching system 200 can represent an access point such as a WLAN base station.

As illustrated, switching system 200 includes switch 210 that supports an internal port and a plurality of external ports 0-N via MAC and PHY interfaces. As would be appreciated, support for an internal port would be implementation dependent. For example, a VoIP phone could include an internal port while a switch box would not. As further illustrated in FIG. 2, switch 210 is also supported by buffers 220 and control 230.

As illustrated, the PHYs of FIGS. 1 and 2 are enhanced EEE PHY devices. These enhanced EEE PHY devices can be incorporated into an existing integrated Ethernet controller 110 or switching system 200. From a system perspective, it is desirable to re-qualify an enhanced EEE PHY device, as compared to re-qualifying an entire new chipset, along with its associated software. For this reason, it is desirable to reuse existing MAC devices with enhanced EEE PHY devices. As noted, this scenario represents a large portion of today's MAC-containing device market.

In accordance with the present invention, existing MAC devices can be reused with enhanced EEE PHYs by the inclusion of a capability in the EEE enhanced PHYs to generate PAUSE frames that could be passed up the stack to the controlling MAC of that PHY. To illustrate this feature of the present invention, reference is now made to the example environment of FIG. 3.

Figure 3:
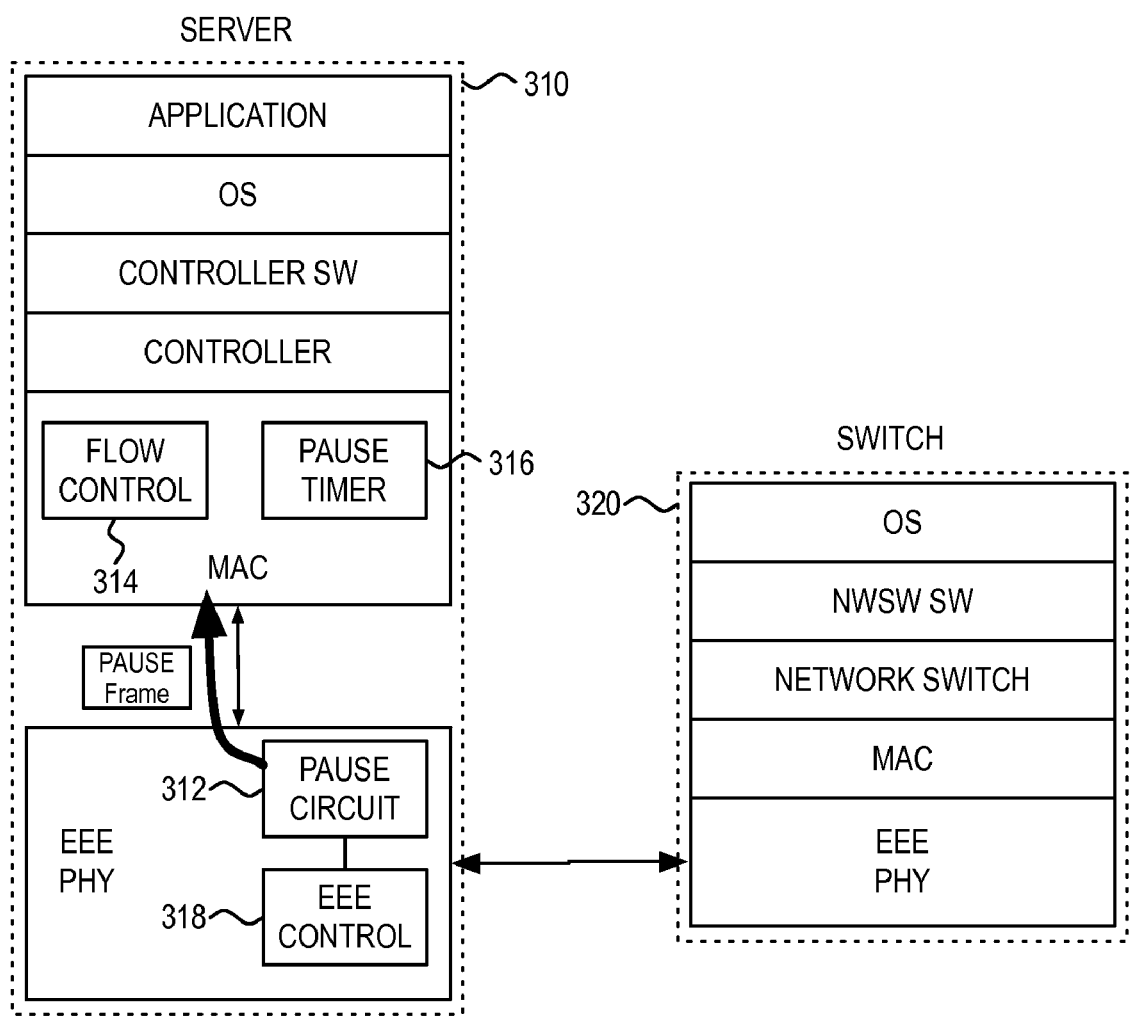
FIG. 3 illustrates an example of a generation of a PAUSE frame based on an energy efficient Ethernet PHY with a control policy assist that uses PAUSE.

As illustrated in FIG. 3, server 310 is communicating with switch 320 via enhanced EEE PHYs. Here, enhanced EEE PHY in server 310 includes pause circuit 312, which is designed to originate and send PAUSE frames to the MAC in server 310.

Here, it should be noted that conventional systems typically send PAUSE frames that are generated by a far end device [remote/link partner] such as switch 320. This can be the case, for example, where a receive buffer in switch 320 becomes full, thereby necessitating a request from switch 320 across the link to server 310 requesting that server 310 pause further transmissions. In the present invention, PAUSE frames are generated by an enhanced EEE PHY in the same device on the same side of the link in which transmissions are sought to be paused. Significantly, the generation of the PAUSE frames can be triggered by an EEE control policy. One of the advantages of using PAUSE frames is that it taps into system buffering for PAUSE, which is often much larger as compared to anything that can be put into a PHY.

As further illustrated in FIG. 3, the PAUSE frame is sent by pause circuit 312 to the MAC in server 310. This PAUSE frame is used in a backpressure mechanism in server 310. This backpressure mechanism is facilitated by flow control 314 in the MAC. Upon receipt of the PAUSE frame, flow control 314 ceases further transmission until the expiration of pause timer 316. Suspension of further transmission causes traffic to accumulate in buffers within server 310.

In one embodiment, pause timer 316 can be set to a value indicated by the PAUSE frame, thereby suspending transmissions for a specified period of time. For an EEE PHY that is entering or exiting a low power consumption mode, the specified period of time can be defined to be sufficient to support the transition between two different PHY energy states. In one example, the specified period of time can allow the EEE PHY to resynchronize/retrain itself when it returns to an active state from the low power consumption mode. In one embodiment, the suspended transmission can be restarted upon receipt of a PAUSE 0 frame.

As noted, the generation of a PAUSE frame by pause circuit 312 is triggered by an EEE control policy. As illustrated in FIG. 3, this EEE control policy can be implemented at least in part in EEE control module 318 within the EEE PHY. In one embodiment, the entire EEE control policy is contained in the EEE PHY. In another embodiment, the EEE control policy can be completely triggered by a higher layer that may have access to the traffic profile but does not have real-time control of the buffering.

In operation, EEE control module 318 alerts pause circuit 312 that a PAUSE frame should be generated. For example, EEE control module 318 can alert pause circuit 312 that a PAUSE frame should be generated when EEE control module 318 determines that the EEE PHY is to enter a low power consumption mode. As would be appreciated, the decision to transition into or out of the low power consumption mode can be based on various EEE considerations. In general, EEE control mechanisms can touch a number of devices and software throughout the stack and across the link. Regardless of the particular EEE control policy mechanism that is implemented, EEE control module 318 can generate the trigger for pause circuit 312 to generate a PAUSE frame for the MAC.

As an example, assume that a 10 G Ethernet controller does not have any hardware support for an EEE enhanced PHY's low power consumption mode. This transition into the low power consumption mode can be based on a request from the link partner or the device's own EEE control policy (e.g., triggered when the PCIE goes into an L1 state, buffer level hits a watermark, rate of change of a traffic queue hits a threshold, etc.). As the EEE enhanced PHY initiates its transition into the low power consumption mode, EEE control module 318 instructs pause circuit 312 to generate a PAUSE frame that is sent up to the 10 G Ethernet controller. This PAUSE backpressure mechanism prevents the local MAC from sending any data to the EEE enhanced PHY. When the EEE enhanced PHY exits the low power consumption (again due either to the local control policy or to the link partner request), the PHY would set the pause timer to be 0 after it comes back up into steady state and is ready for transmission.

Figure 4:
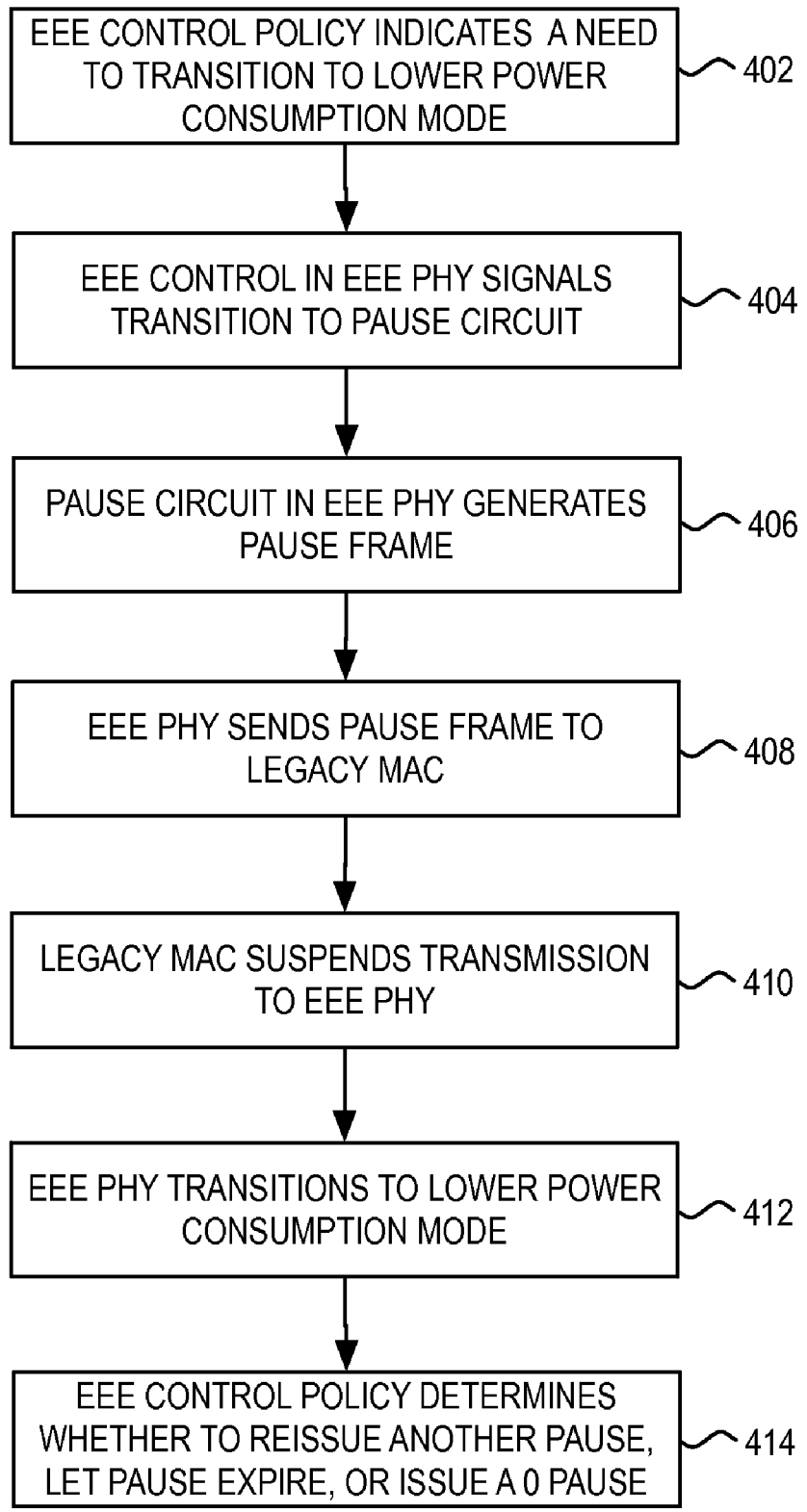
FIG. 4 illustrates a flowchart of a process of the present invention.

To further illustrate the features of the present invention, reference is now made to the flowchart of FIG. 4. As illustrated, the process begins at step 402 where an EEE control policy indicates the need to transition to a lower power consumption mode. As would be appreciated, the EEE control policy can be based on an analysis of various link-related parameters on either end of the link. Regardless of the particular EEE control policy that is utilized, the PHY is alerted of the indicated need to transition to the lower power consumption mode. Upon such an indication, at step 404, the EEE control in the EEE PHY then signals the power consumption mode transition to the pause circuit in the EEE PHY. In response to such a received signal, the pause circuit in the EEE PHY then generates a pause frame at step 406. At step 408, the EEE PHY then sends the generated PAUSE frame upstream to the legacy MAC.

Upon receipt of the PAUSE frame, the legacy MAC, at step 410, then suspends transmission of traffic to the EEE PHY that originated the PAUSE frame. This transmission suspension would continue until the pause timer expires, or a zero PAUSE frame is received. At this point, the EEE related functions can then commence where the EEE PHY then transitions to the lower power consumption mode (e.g., LPI or subset PHY mode) at step 412. During this lower power consumption mode, the EEE control policy would then monitor the situation at step 414. During this monitoring, the EEE control policy can monitor the expiration of the PAUSE timer to determine whether it should be allowed to expire or whether another PAUSE should be issued. Moreover, the EEE control policy can also determine whether a 0 PAUSE should be issued, thereby transitioning out of that state.

As has been described, an EEE control policy can be used to trigger the generation of a PAUSE frame, thereby leveraging existing backpressure mechanisms in a unique manner. In an alternative embodiment, a software mechanism can be used to simulate the receipt of an EEE PHY generated PAUSE frame. In this manner, the hardware PAUSE mechanism need not actually be triggered to achieve the results that are effected in software. In a further embodiment, a PHY without the PAUSE circuitry can be used with the software mechanism that simulates the receipt of a EEE PHY generated PAUSE frame.

In one embodiment, the EEE PHY generated PAUSE mechanism can be used in combination with other mechanisms that are designed to handle traffic from the MAC that may not be accommodated by the PHY at that point in time. For example, the principles of the present invention can be used with other buffering mechanisms that are available in the MAC or PHY that are designed to absorb traffic intended for the PHY. This additional buffering can be used to absorb traffic that is generated from conventionally generated PAUSE frames, which are not precluded through the use of PAUSE frames for EEE purposes. The additional buffering can also be used to reduce latency.

Figure 5:
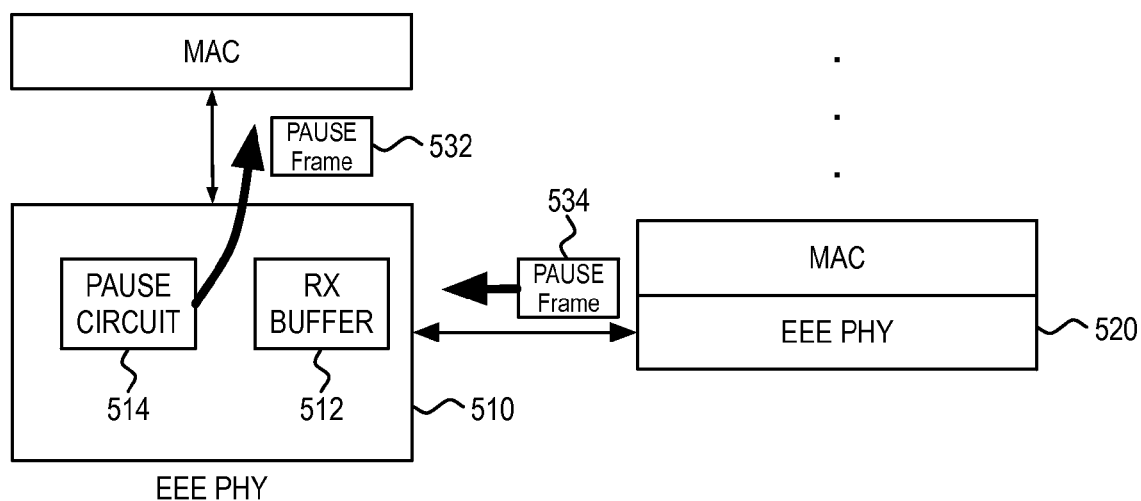
FIG. 5 illustrates an example of an energy efficient Ethernet PHY that includes a receive buffer.

In one embodiment, the EEE PHY also includes a buffer on the receive (RX) side as illustrated in FIG. 5. RX buffer 512 in EEE PHY 510 is generally designed to buffer traffic that is received from EEE PHY 520. One of the benefits of such RX buffering is that EEE PHY 520 may send traffic to EEE PHY 510, when EEE PHY 510 decides to transition into a lower power consumption mode. As described above, this transition would be accompanied by the generation of PAUSE frame 532 by the local side. In this scenario, RX buffer 512 would be designed to absorb receive-side ingress, thereby ensuring that PAUSE frame 532 does not step over any packets coming from EEE PHY 520 on the remote side. In one embodiment, RX buffer 512 is a relatively shallow buffer that can absorb receive-side traffic while PAUSE frame 532 (e.g., 64 byte packet) is sent to the MAC. It should be noted that one way to avoid RX buffering is to wait for Y seconds of seeing nothing on the RX before issuing the PAUSE.

Another benefit of the inclusion of RX buffer 512 in EEE PHY 510 is that enables EEE PHY 510 to inspect packets combing from EEE PHY 520 to determine whether it includes a PAUSE frame. This inspection is advantageous in that the remote side may have a delayed reaction to a prior burst. This traffic burst may lead EEE PHY 520 to generate a conventional PAUSE frame 534. In general, PAUSE frame 534, which is generated by the remote side, may be different in value than PAUSE frame 532, which is generated by pause circuit 514 at the local side. For example, PAUSE frame 534 may have a value that is smaller than PAUSE frame 532. In another example, the remote side may have already issued a PAUSE frame that has a value that is greater than a PAUSE frame that the local side issues. In these scenarios, EEE PHY 510 can intercept and rewrite the PAUSE value of any PAUSE frame sent to the MAC to account for other PAUSE frames. By this process, EEE PHY 510 would track the various PAUSE requests.

It should be noted that to accommodate jumbo packets (e.g., 9 k) that would exceed a typical size of RX buffer 512, EEE PHY 510 can be designed to generate a conventional PAUSE to send to the remote side prior to sending a locally generated PAUSE to the MAC.

As would be appreciated, the principles of the present invention can be used in various PHY/MAC interfaces. For example, the PHY/MAC signaling of the present invention can be implemented over Attachment Unit Interface (AUI), media independent interface (MII), serial MII (SMII), reduced MII, (RMII), gigabit MII (GMII), reduced GMII (RGMII), serial GMII (SGMII), 10 gigabit MII (XGMII), 10-Gbps AUI (XAUI), or the like interfaces, out-of-band signaling mechanisms, register-based communication, etc. Further, the principles of the present invention can be used with various PHY types (e.g., backplane, twisted pair, optical, etc.) as well as standard or non-standard (e.g., 2.5 G, 5 G, 10 G, etc.) link rates, as well as future link rates (e.g., 40 G, 100 G, etc.).

It should also be noted that the principles of the present invention can be applied to symmetric or asymmetric applications of EEE. In a symmetric application of EEE, both direction of the link would transition between various power consumption modes in a coordinated fashion. In an asymmetric application of EEE, the two directions of the link would transition between various power consumption modes independently.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. An energy efficiency method, comprising:
   detecting, by an energy efficiency control policy module that is implemented in a physical layer device contained within a network device, a need for transitioning of said physical layer device from a first power consumption mode to a second power consumption mode different from said first power consumption mode;
   in response to said detection, generating a control signal by said energy efficiency control policy module in said physical layer device; and
   initiating, by a pause generating module in said physical layer device in response to said control signal generated by said energy efficiency control policy module, a transmission of a pause frame from said physical layer device upstream to a media access control device contained in said network device, said transmitted pause frame being used to facilitate a transition by said physical layer device from said first power consumption mode to said second power consumption mode, wherein said transmitted pause frame initiated by said pause generating module is used by a flow control module in said media access control device to buffer downstream traffic and cease further transmissions by said media access control device downstream to said physical layer device to accommodate said transition in said physical layer device from said first power consumption mode to said second power consumption mode.

2. The method of claim 1, wherein said transition is to a low power idle mode.

3. The method of claim 1, wherein said transition is to a subset physical layer device mode.

4. The method of claim 1, wherein said physical layer device is a backplane device.

5. The method of claim 1, wherein said physical layer device is a twisted pair device.

6. The method of claim 1, wherein said detecting comprises monitoring a traffic queue.

7. The method of claim 1, wherein said detecting comprises monitoring a subsystem state.

8. The method of claim 1, wherein said transitioning is part of a symmetric transitioning for both directions of a link.

9. The method of claim 1, wherein said transitioning is part of an asymmetric transitioning for a single direction of a link.

10. The method of claim 1, wherein said initiating comprises initiating by a hardware module.

11. The method of claim 1, wherein said initiating comprises initiating by a software module.

12. A physical layer device for use in a network device, comprising:
    a port that is configured for coupling to a link partner device via a network cable;
    an interface for coupling of the physical layer device to a media access control device contained in the network device;
    an energy efficiency control policy module that is configured to determine a need for transitioning of the physical layer device from a first power consumption mode to a second power consumption mode different from said first power consumption mode, said energy efficiency control policy being further configured to generate a control signal in response to said determined need for transitioning of the physical layer device; and
    a pause generating module that is responsive to said control signal generated by said energy efficiency control policy module, said pause generating module being configured to initiate a transmission of a pause frame to said media access control device via said interface, said transmitted pause frame being used by a flow control module in said media access control device to buffer downstream traffic and cease further transmissions by said media access control device downstream to the physical layer device to accommodate a transition in the physical layer device from said first power consumption mode to said second power consumption mode.

13. The physical layer device of claim 12, wherein said transition is to a low power idle mode.

14. The physical layer device of claim 12, wherein said transition is to a subset physical layer device mode.

15. The physical layer device of claim 12, wherein said energy efficiency control policy module monitors a traffic queue.

16. The physical layer device of claim 12, wherein said energy efficiency control policy module monitors a subsystem state.

* * * * *